March 17, 1959
W. K. ROBBINS
2,877,621
THREE PIECE SEPARABLE SECTION CHAIN CONNECTOR AND THE LIKE
Filed March 21, 1955
2 Sheets-Sheet 2
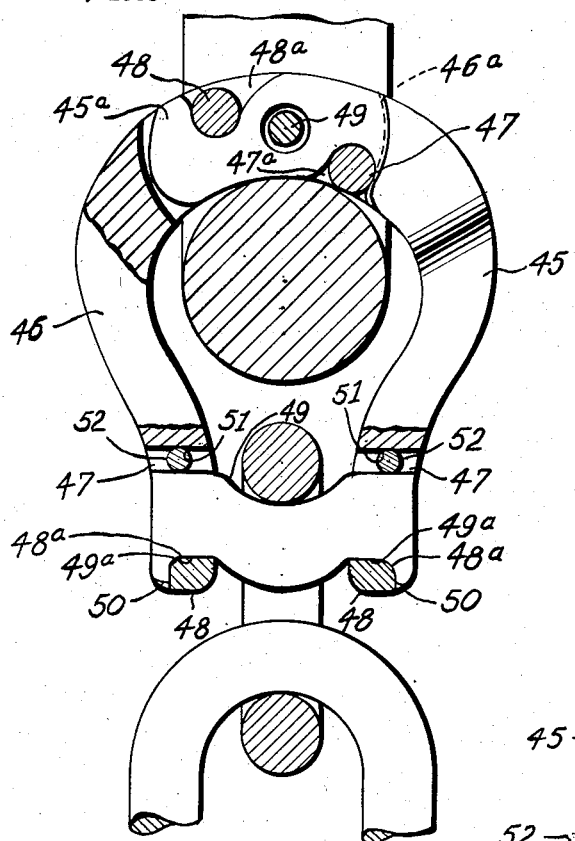
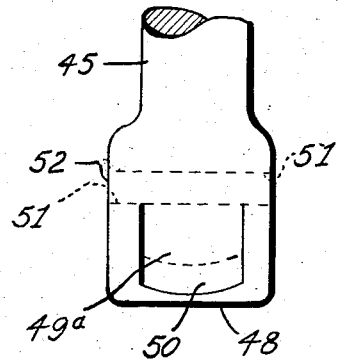
INVENTOR
William K. Robbins
BY
ATTORNEY United States Patent Office 2,877,621
Patented Mar. 17, 1959

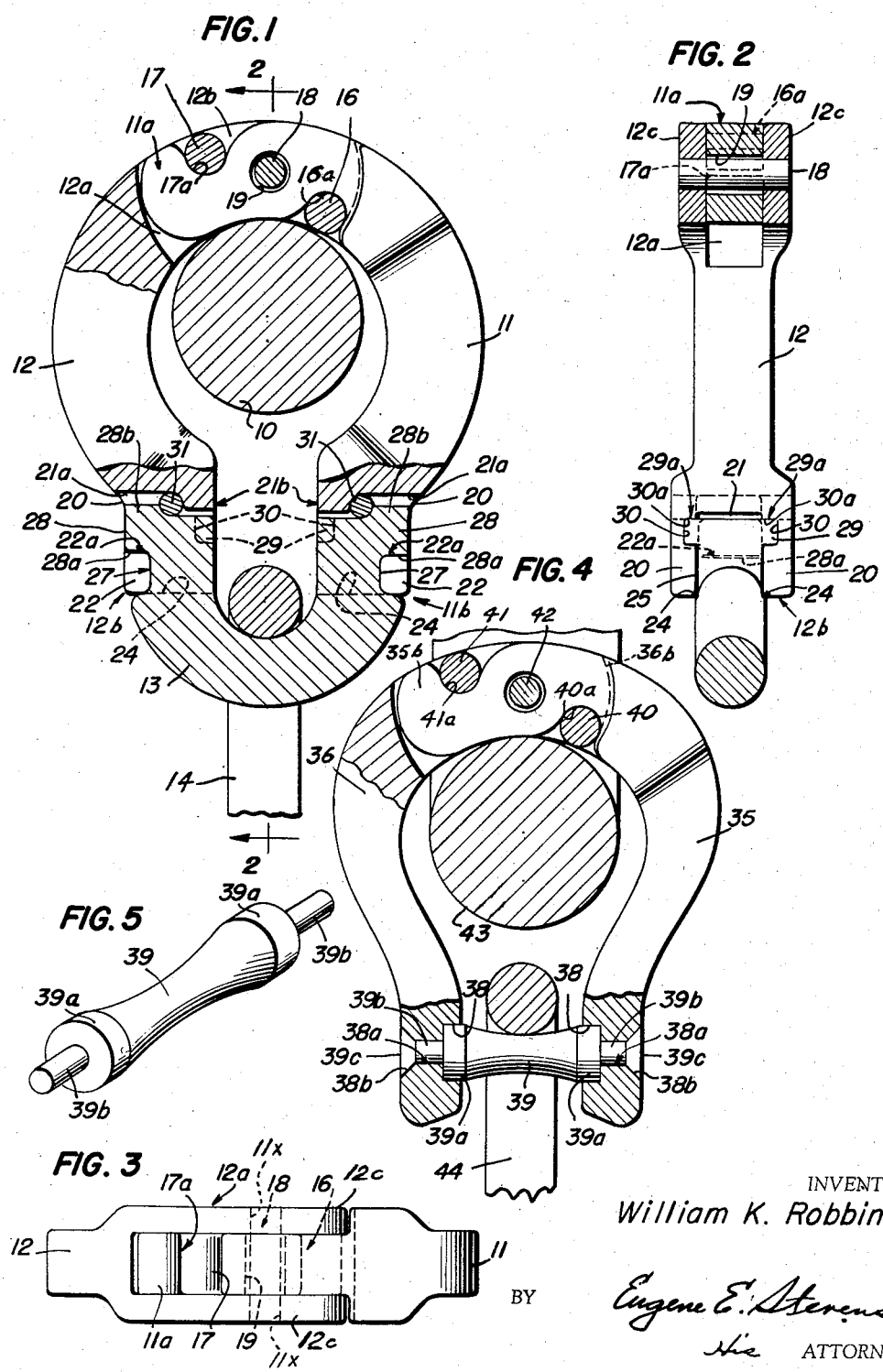

2,877,621

THREE PIECE SEPARABLE SECTION CHAIN CONNECTOR AND THE LIKE

William K. Robbins, Milwaukee, Wis.

Application March 21, 1955, Serial No. 495,381

13 Claims. (Cl. 59—88)

My invention relates to separable section chain links and other loop form connectors and while especially suited for the connection of the sling and pull chains to a dragline bucket, it may be used for many other purposes such as an anchor chain connector, etc.

Heretofore it has been necessary in establishing a lift sling, or pull chain, connection to a dragline type of excavating bucket, to employ a solid wear ring which is secured directly to each bucket clevis or other fitting, and to secure the sling and pull chain terminals to such wear rings. Such wear rings are also employed to establish chain connection to ship anchors and to many other items.

Such wear rings are not only costly, especially in large sizes, but when they require replacement it is necessary to disconnect them from both the chain terminal and the drag bucket clevis or other fitting. This is necessarily a time-consuming and hence a costly operation, as is also the installation of a new wear ring; and often the necessary tools, etc., are not available at the time and place where the job has to be done as in the case of a diver working under water to fix a broken anchor connection.

It is therefore the primary object of this invention to provide a separable section connector for the purpose specified which will eliminate the necessity for the use of a wear ring in establishing chain or other connections with drag buckets, anchors, etc., the connector serving the purpose of both a wear ring and as a separable section chain link for making connection between a chain end and wear ring.

Additionally, the invention contemplates a device of this kind which is simple in construction, strong and durable, and which can be quickly applied for use or removed, even by a diver working under water.

Another aim of the invention is to provide a connector for chain or other terminal members which are of different diameters and which will effectually prevent members from jamming in the connector.

Various other objects and advantages of the invention will be understood and appreciated by those versed in the art upon reference to the accompanying drawings in connection with the detailed description thereof appearing hereinafter.

It is emphasized that the disclosures hereof are to be taken as illustrative rather than limitative, as the invention is susceptible of other mechanical expressions within the spirit and scope of the subject matter claimed hereinafter.

In the drawings, wherein the same reference characters have been used to designate the same parts wherever they appear throughout the several views—

Fig. 1 is an elevational view of a connector embodying my invention, certain parts being broken away and shown in section;

Fig. 2 is a sectional view taken on the line 2—2 of Fig. 1;

Fig. 3 is a top plan view;

Fig. 4 is an elevational view, partly broken and partly in section, showing a modified form of the invention;

Fig. 5 is a perspective view of an element of the device of Fig. 4;

Fig. 6 is a view similar to Fig. 4, showing a further modification; and

Fig. 7 is a side elevational view of the connector of Fig. 6.

Referring to the drawings by reference characters and turning first to the form of invention shown in Figs. 1-4, inclusive, Fig. 1 shows a loop-form connector comprising three main separable sections, namely, the arms 11 and 12 and the U-shaped member 13. The inner ends of the respective arms 11 and 12 have a separable load-sustaining connection with the side limbs of the U-shaped member 13, which latter defines one end of the connector and parts of opposite sides thereof.

As shown in Fig. 1, each of the arms 11, 12 is somewhat sickle-shaped in that they provide substantially straight socket-providing inner ends 11b, 12b and curved outer portions which define the second end of the loop-form connector and have interfitting tongue and bifurcation terminals 11a, 12a, respectively (see Figs. 1 and 3). As indicated in Figs. 1 and 3, each of the arm terminals 11a, 12a extend throughout the major portion of the second end of the loop-form connector and portions of the inner edges of each of said terminals 11a, 12a are subjected to the longitudinal load applied by member 10. Thus, each arm terminal 11a, 12a cooperates to sustain the longitudinal load applied to that end of the connector by the ring or fitting 10 shown in the larger portion of the connector which is defined by arms 11, 12 (see Fig. 1).

The load-sustaining connection between the socket-providing inner ends 11b, 12b of arms 11, 12 will be described shortly; and it is to be noted that Fig. 1 shows a chain link or the like 14 in the smaller end of the connector which is provided by the U-member 13.

Referring again to the tongue and bifurcated arm portions 11a, 12a, the spaced side walls 12c of the bifurcated portion 12a are shown to be connected by load-transferring lugs 16, 17. These load-transferring lugs 16, 17a are received in the seats 16a, 17a that are provided in the inner and outer edge portions, respectively, of the tongue 11a, as shown in Fig. 1. As will be noted, the lug 16 is located adjacent the inner edges of walls 12c of bifurcated portion 12a near the free end of the latter, while the lug 17a is positioned well inwardly of the free end of 12a and adjacent the top edges of walls 12c thereof.

Since, as earlier noted herein, portions of each of the inner edges of arm terminals 11a, 12a are exposed to load pressure from member 10 in the proximate end of said connector, a portion of such load will be transferred by 16, 16a and 17, 17a from one terminal 11a, 12a to the other.

Pivotally connecting the tongue portion 11a and the bifurcated portion 12a is a self-locking sleeve pin 18 which is driven through the aligned holes 11x in the side walls 12c of the bifurcation portion 11a; and through the somewhat enlarged hole 19 in the tongue portion 11a of the arm member 11. This sleeve pin 18 is not subjected to any load when the connector is in service, any slight give that may occur in portions 11a, 12a being compensated for by the hole 19 in the tongue portion 11a being oversized with respect to the sleeve pin 18. It will be apparent that if the arms 11, 12 are swung outwardly away from one another, then the tongue seats 16a, 17a will move away from the lugs 16, 17a, and vice versa.

Coming now to the load-supporting connection between the socketed inner ends 11b, 12b of the arms 11, 12 with the limbs of the U-shaped member 13, it will be noted that the latter are provided with outwardly projecting end stubs 28 which are received in the arm member sockets 11b, 12b.

Since the limb terminals of the U-shaped member 13 and the socket portions 11b, 12b are duplicate assemblies, a description of one will suffice for both.

Thus, referring to Figs. 1 and 2, it will be noted that the limb portions of the U-shaped member 13 are reduced in thickness inwardly from their free ends as at 25 to provide flat sides terminating in shoulders 24 at opposite sides of said limb portions. Each of the sockets 11b, 12b provides the laterally spaced side walls 20 which define the socket space 21 which receives the flat sided limb terminals, the inner end of each socket being defined by a wall 21a as indicated in Fig. 1.

Connecting the side walls 20 of the socket members 11c, 12c, are load-sustaining bridge portions 22 which are located adjacent the outer edges of said side walls 20 and at the portions of said socket members which are adjacent the limb shoulders 24, as also indicated in Fig. 1.

The limb portions of the U-shaped member 13 have their outer edge portions cut away to define the seats 27 for the related bridge member 22; and also to provide the outwardly projecting studs 28 previously referred to. The outwardly projecting studs 28 of the U-shaped member 13 provide the load-supporting shoulders 28a which engage the respective load-supporting shoulders 22a of the bridge members 22 as shown in Fig. 1.

Referring to Fig. 1 and likewise to Fig. 2, it will be seen that each stud 28 has an outwardly projecting lug portion 29 at each side at the site of its forward rear corner. These lugs 29 as shown in Fig. 2, are received in recesses 30 opening from the inner edges of opposite side walls 20 of the sockets 11b, 12b. The lugs 29 and recesses 30 provide interengaging load-supporting shoulders 29a, 30a, respectively, as shown in Figs. 1 and 2. These interengaging lug and recess shoulders 29a, 30a serve to overcome any tendency that the stud ends 28 of the U-shaped member 13 might have to bend inwardly in service as the result of application of load thereto at the site of bridge shoulders 22a. However, where the connector is to be subjected to light duty only, the lugs 29 and recesses 30 can be eliminated.

Fig. 1 also best illustrates the means for holding the studs 28 seated in the arm sockets 11b, 12b. In carrying out this phase of the invention, the outwardly directed studs 28 of the U-shaped member 13 have nose projections 28b extending in the direction of the axis of the related limb of U-shaped member 13. Spaced inwardly of each of said nose portions 28b is a shoulder 21b provided by the socket portion 11b (or 12b) of the related arm 11, 12 and the parts are retained in position by means of a drive pin 31 driven through holes in the socket walls 20 to interpose between the portions 28b, 21b. However, when pins 31 have been removed, it will be apparent that the related arm 11 or 12 can be swung outwardly until the shoulders 28b and 21b engage; and when that happens, the outer end of the related stud 28 will lie inwardly of the plane of the inner surface of the associated socket bridge 22 so that the U-shaped member 13 can be simply pulled down out of the illustrated assembled relationship with the sockets 11b, 12b of the arms 11, 12. Also, outward movement of the arms 11, 12 as aforestated will unseat the arm socket lugs 16, 17 from the tongue seats 16a, 17a.

An important point to be noted is that when the connector is in service any tendency of the enlarged arm-provided portion to "lengthen," so to speak, will be resisted by the portions 16, 16a and 17, 17a which resist movement of the arms 11, 12 toward one another.

Referring to the modified form of the invention shown in Figs. 4 and 5, the connector there illustrated eliminates the use of a U-shaped member such as 13 of Fig. 1. In lieu thereof, the parallel inner ends of the arms 35, 36 are connected by the cross member 39 having the enlargements 39a seated in the recesses 38 in the opposed inner surfaces of said arms 35, 36.

The member 39 has reduced rivetable extensions 39b, which are extended through holes 38a of said arms which communicate with the recesses 38. When the member 39 is in place, as shown in Fig. 5, the ends of 39b are riveted over as indicated at 39c to be received in flared enlargements 38b of said holes 38a as shown.

The connector, as shown in Fig. 4, widens beginning at a point adjacent the member 39, the said arms 35, 36 being curved for this purpose and terminating in interfitting portions 35b, 36b, corresponding to 11a, 12a, respectively, of Fig. 1. The portion 36b is a bifurcation receiving the tongue portion 35b in the same fashion as the tongue portion 11a of Fig. 1 is received between the sides of the bifurcation 12a of that form of the invention.

The bifurcation portion 35b provides diagonally disposed connecting cross lugs 40, 41 which are received in seats 40a, 41a, in opposite edges of the tongue portion 36b of the member 36. In this respect, the Fig. 4 form of the invention conforms to that illustrated in Fig. 1; and there is also the drive pin 42 which is carried by the arm portion 36b and connects the portions 35b, 36b against separation, the arm portion 35b providing the enlarged pin-surrounding hole 19, as shown. The cross member 39 is shown as carrying the end link of a chain 44 while the enlarged portion of the connector is shown receiving a ring or clevis member 43.

Referring to the further modification shown in Figs. 6 and 7, this deals with a low-priced connector, particularly for relatively small-sized chains, say ⅞" or less in cross-section. Here again is a three-part connector providing the generally sickle-shaped arms 45 and 46 having the sockets 47 adjacent their parallel lower ends for seating the ends of a load-carrying cross bar 49. The transverse sockets 47 are deeper than the thickness of the end-adjacent seating portions 49a of bar 49, as shown, and load-sustaining bridge portions 48 connect opposite sides of the respective sockets 47. Each end of the cross bar 49 beyond the related bridge seat 49a has a nose portion 50 overlying the outer side of the adjacent socket bridge 48 to prevent outward swinging of arms 45, 46. Drive pins 52 extending through holes 51 in the walls of sockets 48 engage the back edge of cross bar 49 to retain it seated on socket bridges 48.

The outer end formation of arms 45, 46 is similar to that of the arms 11, 12 of Fig. 1 and to arms 35, 36 of Fig. 4. Thus a tongue terminal 45a of arm 45 is received in the bifurcation 46a of arm 46; and recesses 47a, 48a of the tongue engage the bifurcation (46a) carried cross pins 47a, 48 to provide the load-sustaining outer end of the connector. A connector pin 49 carried by arm portion 46a and corresponding to pin 18 of Fig. 1 retains 45a, 46a against accidental separation. Pin 49 is spacedly surrounded by the enlarged hole which is provided by the other arm portion 45a.

In each form of the invention it is to be noted that the pairs of lug and seat assemblies such as 16, 16a and 17, 17a of Fig. 1; 40, 40a and 41, 41a of Fig. 2; and 47, 47a and 48, 48a of Fig. 6 are so spaced as to admit of insertion of an arm portion therebetween when assembling the arms. Also in each instance, when the arms (45, 46, for instance in Figs. 6 and 7) are assembled, the pairs of lug and seat assemblies act at least as initial pivots for the lateral swinging of different ones of said arms; and also prevent relative bodily shifting of the arms longitudinally of the connector.

Also referring to Fig. 6, it will be evident that when the pins 52 have been removed and cross bar 48 has been shifted upwardly, at least the left arm 46 (see Fig. 6)

can be swung laterally outward about the cross pin 48 as an axis to open the lower part of the link with the cross bar 49 still supported in a downwardly rocked position in the right hand seat 49a as viewed in Fig. 6. Similarly as to Fig. 4, when the left hand end of 39c, 39b and the related enlarged portion 39a of 39 has been driven out of 38a, 38, the left arm 36 (Fig. 4) can be swung laterally outward about its seat 41a and the cross lug (or pin) 41 as a pivot.

Obviously, the arm-connecting pivot pins such as 18 in Fig. 1, can be dispensed with.

Furthermore, it is important to note that the connector end-providing members such as 13 in Fig. 1, 39 in Fig. 4, and 49 in Fig. 6 may be considered as a functionally integral part of one of the link limb portion-providing arms such as 11, 12 in Fig. 1 since only one of said arms need be swung outwardly to enable chain parts or the like to be removed from the connector.

When, for instance, the arm 12 of Fig. 1 is to be swung outwardly about either lug 17 or pin 18 as an axis following removal of the related pin 31, and while the U-member 13 remains rigidly connected to the companion arm 11, such action is permitted to take place regardless of whether shoulders 28b and 21b engage. Engagement of shoulders 28b and 21b simply cams arm 12 upward slightly to allow 21b to pass 28b, such action being permitted by the hole (19) provided space about pin 18, if the latter is used.

Having thus described my invention, what I claim is:

1. In a loop form connector of the class described, an end member providing one end of said connector and having laterally spaced terminal portions defining side parts of said connector, a pair of laterally spaced arms completing the sides of said connector and having inturned sidewardly overlapping end portions of substantially equal length, said inturned overlapping end portions constituting the opposite end of said connector and providing substantially aligned load-supporting inner edges, the other ends of said arms and said terminal portions of said end member having laterally interconnectable load-sustaining portions, said inturned overlapping end portions carrying a pair of stud portions and a pair of seat portions, each of said stud portions interengaging with one of said seat portions to transmit loads between said overlapping end portions and to provide pivot form supports for said arms, said interengaging stud and seat portions being spaced in the direction of the length of said overlapping end portions with the studs carried by the inturned end portion of one of said arms and the seats by the inturned end portion of the other of said arms so as to admit of insertion of the seat-providing arm portion between said studs when assembling or disassembling the arms, and the respective seat portions opening from said load-supporting edge and from the opposite edge of said seat-providing arm portion, whereby to mount at least one of said arms for lateral swinging movement with respect to one of stud portions as an axis while at the same time preventing relative bodily movement of the assembled arms longitudinally of the connector.

2. The structure of claim 1, and a removable pivot-permitting means connecting said overlapping arm portions between said pairs of stud and seat portions.

3. The structure set forth in claim 1 and a removable load-free pivot permitting means connecting said overlapping arm portions midway between said pairs of lugs and seats, at least one of said overlapping portions providing a clearance space surrounding said pivot means.

4. The structure set forth in claim 1, and said connector end-providing member comprising a cross piece having enlargements adjacent each end and diametrically reduced rivetable reductions as extensions of said enlargements, and said arms having opposed surface recesses receiving the respective cross piece enlargements, each of said arm recesses having a transverse hole extending through said arm, and the rivetable reductions passing through said holes and peened out at the exterior surfaces of said arms.

5. The structure of claim 1, and said end member comprising a substantially U-shaped member having side legs providing said connector side part-defining terminal portions.

6. The structure of claim 1, and said end member comprising a substantially U-shaped member having side legs providing said connector side part-defining terminal portions, and substantially load-free and removable means mutually engaging said laterally interconnectable load-sustaining portions at each side of said connector for maintaining the same in operative engagement.

7. The structure of claim 1, and said end member comprising a substantially U-shaped member having side legs providing said connector side part-defining terminal portions, and removable and substantially load-free means pivotally connecting the inturned overlapping end portions of said arms against separation.

8. The structure of claim 1, and said end member comprising a substantially U-shaped member having side legs providing said connector side part-defining terminal portions, and said laterally interconnectable load-sustaining portions comprising in each instance a stud and a socket.

9. The structure of claim 1, and said end member comprising a substantially U-shaped member having side legs providing said connector side part-defining terminal portions, and said laterally interconnectable load-sustaining portions comprising inwardly opening arm-provided sockets and outwardly directed studs provided by the U-member-provided terminal portions.

10. The structure of claim 1, and said end member comprising a substantially U-shaped member having side legs providing said connector side part-defining terminal portions, and the U-member legs and adjacent portions of said arms being spaced closer together than the arm portions adjacent the opposite end of said connector, whereby the latter is adapted to accommodate different sized elements in opposite end portions.

11. The structure of claim 1, and one of said inturned and sidewardly overlapping arm portions comprising a tongue while the other of said arm portions comprises a bifurcation receiving said tongue.

12. The structure of claim 1, and one of said inturned and sidewardly overlapping arm portions comprising a tongue while the other of said arm portions comprises a bifurcation receiving said tongue, said studs being carried by the bifurcated arm portion and said seats formed in the arm portion-provided tongue.

13. A loop form connector for chains and the like comprising a pair of separable laterally spaced connector side limb portion-providing arms having inturned, substantially longitudinally coextensive, and sidewardly overlapping end portions constituting one load-sustaining end of the connector; said inturned arm portions providing substantially aligned load-supporting inner edges, the other end of one of said arms having a functionally integral portion constituting the second load-supporting end of said connector and having a limb portion opposing terminal, laterally interconnectable load-supporting portions provided by said terminal and the second end of said other arm, two interengaging load transmitting and arm pivot-providing stud and seat portions carried by the overlapping connector end-providing arm portions, said stud and seat portions being spaced in the direction of the length of the overlapping arm portions with the studs carried by one arm portion and the seats by the other arm portion so as to admit of insertion of the seat-providing portion between the studs when assembling or disassembling the arms, and the respective seat portions opening from the load-sustaining arm edge and from the opposite longitudinal edge, whereby to shiftably support said arms and to mount at least one of the same for lateral swinging movement with respect to one of said stud and seat portions as an axis, while at the same time preventing relative bodily movement of the assembled arms longitudinally of the connector.

References Cited in the file of this patent

UNITED STATES PATENTS

| | | |
|---|---|---|
| 163,577 | Clements | May 25, 1875 |
| 567,511 | Roden | Sept. 8, 1896 |
| 594,043 | Thompson | Nov. 23, 1897 |
| 669,382 | Carter | Mar. 5, 1901 |
| 1,688,176 | Clark | Oct. 16, 1928 |
| 1,702,596 | Crockett | Feb. 19, 1929 |
| 1,736,373 | Seeger | Nov. 19, 1929 |
| 2,385,232 | Robbins | Sept. 18, 1945 |
| 2,616,747 | Ratigan | Nov. 4, 1952 |
| 2,700,274 | Waller | Jan. 25, 1955 |

FOREIGN PATENTS

| | | |
|---|---|---|
| 299,187 | Great Britain | Oct. 25, 1928 |